(12) United States Patent
Motupally et al.

(10) Patent No.: US 8,288,054 B2
(45) Date of Patent: Oct. 16, 2012

(54) ALLOY CATALYSTS FOR EXTENDING LIFE OF FUEL CELL MEMBRANES AND IONOMER

(75) Inventors: Sathya Motupally, Milford, CT (US); Ned Cipollini, Enfield, CT (US); Lesia Protsailo, East Hartford, CT (US); Andrew Haug, Holyoke, MA (US); Tommy Skiba, East Hartford, CT (US); Chi-Hum Paik, Manchester, CT (US)

(73) Assignee: UTC Power Corporation, South Windsor, CT (US)

( * ) Notice: Subject to any disclaimer, the term of this patent is extended or adjusted under 35 U.S.C. 154(b) by 1086 days.

(21) Appl. No.: 12/090,513

(22) PCT Filed: Oct. 27, 2005

(86) PCT No.: PCT/US2005/039196
§ 371 (c)(1), (2), (4) Date: Apr. 17, 2008

(87) PCT Pub. No.: WO2007/050084
PCT Pub. Date: May 3, 2007

(65) Prior Publication Data
US 2008/0286616 A1    Nov. 20, 2008

(51) Int. Cl.
*H01M 4/90* (2006.01)
*H01M 4/92* (2006.01)
*H01M 8/10* (2006.01)

(52) U.S. Cl. ......... 429/485; 429/487; 429/492; 429/524

(58) Field of Classification Search .................. 429/485, 429/487, 492, 493, 524
See application file for complete search history.

(56) References Cited

U.S. PATENT DOCUMENTS

| | | | |
|---|---|---|---|
| 5,472,799 A | 12/1995 | Watanabe | |
| 5,677,074 A * | 10/1997 | Serpico et al. | 429/481 |
| 6,607,856 B2 * | 8/2003 | Suzuki et al. | 429/492 X |
| 6,855,452 B1 | 2/2005 | Cooper et al. | |
| 7,112,386 B2 | 9/2006 | Cipollini et al. | |
| 7,125,822 B2 * | 10/2006 | Nakano et al. | 429/524 X |
| 7,132,187 B2 | 11/2006 | Sugawara et al. | |
| 7,220,514 B2 * | 5/2007 | Yasumoto et al. | 429/492 X |
| 7,384,552 B2 * | 6/2008 | Calundann et al. | 429/492 X |
| 7,473,486 B2 | 1/2009 | Yoshimura et al. | |
| 7,566,514 B2 | 7/2009 | Lee et al. | |
| 2004/0043283 A1 | 3/2004 | Cipollini et al. | |
| 2004/0161641 A1 * | 8/2004 | Lee et al. | 429/12 |
| 2004/0214064 A1 | 10/2004 | Cavalca et al. | |

(Continued)

FOREIGN PATENT DOCUMENTS

CN    1523695 A    8/2004

(Continued)

OTHER PUBLICATIONS

Chinese Office Action for CN200580052390.6 dated Aug. 28, 2009.

(Continued)

*Primary Examiner* — Stephen J. Kalafut
(74) *Attorney, Agent, or Firm* — Bachman & LaPointe, P.C.

(57) ABSTRACT

A membrane electrode assembly includes an anode, a cathode, a membrane disposed between the anode and the cathode, wherein at least one of the anode, cathode and membrane contains a hydrocarbon ionomer, and an electrode catalyst disposed in at least one of the anode and the cathode, wherein the catalyst is a metal alloy catalyst.

13 Claims, 3 Drawing Sheets

U.S. PATENT DOCUMENTS

2004/0265679 A1   12/2004   Yamamoto

FOREIGN PATENT DOCUMENTS

| | | |
|---|---|---|
| JP | 6103992 A | 4/1994 |
| JP | 9161811 A | 6/1997 |
| JP | 10092441 A | 4/1998 |
| JP | 2001118591 A | 4/2001 |
| JP | 2002289208 A | 10/2002 |
| JP | 2004087288 A | 3/2004 |
| JP | 2004335328 A | 11/2004 |
| JP | 2005538508 A | 12/2005 |

OTHER PUBLICATIONS

European Search Report dated Feb. 24, 2012.
Japanese Office Action for 2008-537674 dated Apr. 3, 2012.

* cited by examiner

ALLOY CATALYSTS FOR EXTENDING LIFE OF FUEL CELL MEMBRANES AND IONOMER

BACKGROUND OF THE INVENTION

The invention relates to fuel cells and, more particularly, the invention relates to extending the useful life of membrane and other ionomer containing components of the fuel cell.

PEM fuel cells include a membrane electrode assembly (MEA) which typically includes an anode and cathode on either side of a membrane wherein fuel is fed to the anode, and oxygen to the cathode, and the resulting reaction generates electricity.

Unfortunately, current membrane technology produces stacks of cells including such membranes having useful lifetimes as short as about 1,000 hours which is well short of ultimate goals. When a membrane fails, failure occurs suddenly and ends the useful life of the cell, thereby necessitating immediate intervention. Cells can be excised from a stack for replacement, but will require great care and nevertheless will be accompanied by potential loss of adjacent cells. This type of replacement process is not a viable field service, and it is likely that once membrane failure begins, a stack replacement will be required.

It is therefore the primary object of the present invention to provide fuel cells, which have extended membrane lifetime.

SUMMARY OF THE INVENTION

In accordance with the present invention, the foregoing object has been attained.

According to the invention, it has been found that membrane failure can be caused by the presence of metal and/or metal ion impurities. In PEM fuel cells, metals associated with catalysts used on the anode and cathode, under certain conditions, will migrate into the membrane where they can cause such failure. Thus, in accordance with the present invention, steps are taken to prevent migration of catalyst metals or metal ions into the membrane.

In accordance with the present invention, this is accomplished through the use of alloy catalysts, which are more resistant to initial dissolution and subsequent deposition in the membrane during operation of the fuel cell.

Fuel cells can include membranes and other elements or portions made of per-fluorinated ionomers. Per-fluorinated ionomer material is very well suited to providing long ionomer life, but is expensive. Hydrocarbon and/or non-per-fluorinated ionomers are more desirable from a cost standpoint. However, such membranes are even more susceptible to failure.

Thus, a particular embodiment of the present invention is use of metal alloy catalyst with fuel cells having non-perfluorinated and/or hydrocarbon ionomer material in the membrane or catalyst layers, or in both locations.

According to the present invention, a membrane electrode assembly which comprises an anode; a cathode; a membrane disposed between the anode and the cathode, at least one of the anode, cathode and membrane comprising a hydrocarbon ionomer; and an electrode catalyst disposed in at least one of the anode and the cathode and comprising a metal alloy catalyst.

Additionally, according to the present invention, a membrane electrode assembly is provided which comprises an anode; a cathode; a membrane disposed between the anode and the cathode; at least one additional layer between the membrane and at least one of the anode and the cathode and containing a metal alloy catalyst and ionomer, wherein at least one of the anode, cathode and membrane comprises a hydrocarbon ionomer; and an electrode catalyst disposed in at least one of the anode and the cathode and comprising a metal alloy catalyst.

In further accordance with the invention, a method is provided for preventing migration of catalyst from an electrode of a fuel cell assembly comprising an anode, a cathode, and a membrane disposed between the anode and the cathode; which method comprises the step of providing the catalyst as a metal alloy catalyst in at least one of the anode and the cathode.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

A detailed description of preferred embodiments of the present invention follows, with reference to the attached drawings, wherein.

DETAILED DESCRIPTION

Figure 1:
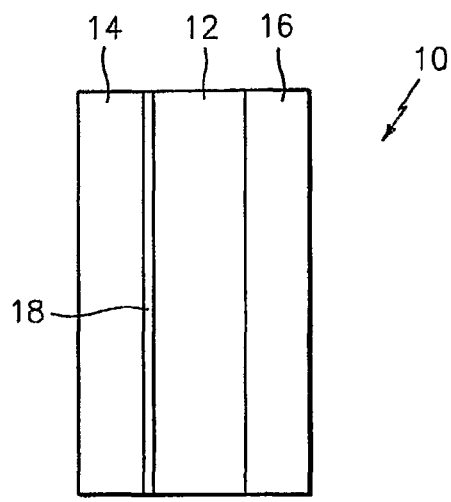
FIG. 1 schematically illustrates a fuel cell assembly in accordance with the present invention.

The invention relates to fuel cells and, more particularly, to PEM fuel cells and a membrane electrode assembly for same which has enhanced membrane and ionomer life. In accordance with the present invention, this enhanced membrane life is provided through use of alloy catalysts which are resistant to dissolution during operation of the fuel cell. This serves to reduce the amount of catalyst metal or metal ions which deposit in or migrate to the membrane, and thereby reduces rate of attack on the membrane material by peroxide radicals and other materials which attack the membrane.

A particular embodiment of the present invention is drawn to protection of PEM fuel cells containing ionomer materials which are particularly susceptible to attack.

The present invention is useful with ionomer material which can substantially benefit from metal alloy catalyst resistance to dissolution and subsequent deposit of catalyst metal during operation of the fuel cell. These materials include hydrocarbon ionomers, ionomers which are not perfluorinated, and ionomers having an inorganic main chain, that is, a main chain constructed with inorganic bonding.

As used herein, hydrocarbon ionomers refer collectively to ionomers having a main chain which contains hydrogen and carbon, and which may also contain a small mole fraction of hetero atoms such as oxygen, nitrogen, sulfur, and/or phosphorus. These hydrocarbon ionomers primarily include aromatic and aliphatic ionomers.

Examples of suitable aromatic ionomers include but are not limited to sulfonated polyimides, sulfoalkylated polysulfones, poly(p-phenylene) substituted with sulfophenoxy benzyl groups, and polybenzimidazole ionomers.

Non-limiting examples of suitable aliphatic ionomers are those based upon vinyl polymers, such as cross-linked poly(styrene sulfonic acid), poly(acrylic acid), poly(vinylsulfonic acid), poly(2-acrylamide-2-methylpropanesulfonic acid) and their copolymers.

Ionomers which are perfluorinated can be based upon a variety of main chains, and have fluorine in place of hydrogen. Hydrogen remaining in the main chain of the ionomer leads to attack which is mediated by catalyst metal as described above. Thus, ionomer which is even slightly less than perfluorinated, for example having less than or equal to 99.975% of hydrogen atoms replaced by fluorine, can benefit from combination with the alloy catalyst of the present invention and are considered to be ionomers which are not perfluorinated.

Ionomers having an inorganic main chain, as used herein, include ionomers based on main chains with inorganic bondings, which can substitute any of a wide range of elements for the carbon. One non-limiting example of such a material is polyphosphazenes composed of N=P bonds. Polyphosphazene derivatives can also be utilized, for example having sulfonic acid, sulfonamide, and/or phosphonic groups.

It should be appreciated that there may be overlap between the above definitions, e.g., many if not all of the hydrocarbon and/or inorganic based ionomers discussed above will also not be perfluorinated.

One example of a current membrane is a per-fluorinated sulfonic acid (PFSA) ionomer. Such ionomers are typically composed of Teflon-like (poly(tetrafluoroethylene)) main chains with sulfoperfluoroalkyleneether side chains. The per-fluorinated sulfonic acid is both expensive and somewhat resistant to the foregoing degradation. Non-per-fluorinatd ionomer can be used as an alternative, and at a lower cost. However, such ionomer is vulnerable to the degradation discussed above.

As set forth above, an ionomer material can be considered to be a non-per-fluorinated material when it is composed of polymeric ionomer which has less than 99.975% of hydrogen-atoms sites replaced by fluorine. Even one site not so occupied generates an unacceptable rate of degradation.

As the amount of sites occupied by fluorine decreases, the benefit of alloy catalyst increases. Thus, the present invention is particularly well suited to instances wherein the ionomer material has less than 99.975% of the hydrogen-atom sites occupied by fluorine, more preferably less than 90% and further more preferably less than 10%.

The primary chemical degradation route encountered in PEM fuel cells is the Fenton mechanism. This mechanism is driven by peroxide that is generated by the reduction of oxygen on metal contaminants (provided by metal contaminants that could be present in the ionic and metallic form) that convert the peroxide into free radicals that can attack sites in the membrane and decompose the membrane. This attack will eventually lead to a failure of the membrane.

A potential source for the metal contaminants is the catalyst that is used in the anode and cathode to facilitate reactions. Pt is the most common catalyst material used and can dissolve under regular operating conditions and exist as ionic and metallic form in the electrodes and membrane.

The PFSA ionomer is per-fluorinated (defined as set forth above as greater than 99.975% of the C—X bonds, where X is not C, are C—F bonds) for imparting excellent chemical resistance. However, per-fluorination requires complicated chemical processing and adds cost to the ionomer.

As set forth above, hydrocarbon membrane fuel cells are becoming attractive from a cost standpoint. However, hydrocarbon membranes are more susceptible to degradation via the Fenton mechanism, especially when the lower cost is due to the elimination of the per-fluorination step. The present invention is directed to protection of membranes and other fuel cell ionomer materials from decomposition, and especially to protection of hydrocarbon membranes and other hydrocarbon ionomer present in the cell, for example, in the anode and/or cathode.

As set forth above, a material is broadly considered to be non-per-fluorinated when less than 99.975% of the C—X bonds, where X is defined as being other than C, are C—F bonds.

It is understood that membranes for PEM fuel cells could be prepared using a blend of different ionomer materials, and a hydrocarbon membrane is considered to be a membrane comprising a hydrocarbon ionomer as defined above when the membrane contains different ionomers and the hydrocarbon ionomer constitutes at least a substantial portion, preferably at least about 50% by volume, of the membrane.

The oxygen reduction reaction which takes place during operation of a fuel cell forms aggressive species which can greatly speed the decomposition of membranes of the fuel cell. Such aggressive species include hydroxyl, peroxyl, and carboxyl radicals that are a byproduct of peroxide decomposition on metals and metal ions.

Previous efforts to combat such decomposition have involved attempts to prevent formation of peroxide in the membrane, and also to prevent migration of peroxide and peroxide forming reactants to the membrane.

While such efforts show promise, the base problem remains and additional approaches toward solving the problem are provided herein.

The membrane/ionomer decay which is addressed by the present invention is decay of the ionomer material which is typically present in the membrane as well as in other layers or components. The present invention serves to reduce decomposition in all such locations by preventing catalyst metal and metal ions from being present in such locations without safeguards to prevent decomposition. This is accomplished through use of metal alloy catalyst as discussed herein, particularly, in connection with the membrane. Thus, the following discussion is given in terms of protection of the membranes, but it should be appreciated that preventing metal catalyst dissolution as is done according to the invention protects ionomer materials, and especially hydrocarbon ionomer materials, in other locations as well.

It has been found in accordance with the present invention that typical fuel cell catalyst materials such as platinum, when present in the membrane, can enhance the attack of radicals upon the membrane material. Hydrocarbon and/or non-per-fluorinated membrane materials are even more susceptible to such attack, as are ionomers having an inorganic main chain.

Based upon the foregoing, and in accordance with the present invention, membrane electrode assemblies are provided using alloy catalysts which advantageously are resistant to dissolution during fuel cell operation and which thereby minimize the migration of catalyst metals into the membrane. This in turn slows decomposition of the membrane and increases the lifetime of same.

According to the present invention, the alloy catalyst can advantageously be a platinum alloy catalyst, and more preferably a binary or a ternary alloy.

One suitable binary alloy has a formula as follows: $Pt_xY_{1-x}$, wherein Y is selected from the group consisting of Co, Ni, V, Cu, Fe, Cr, Pd, Ti, W, Al, Ag, Cu and Au and combinations thereof, and x is between 0.1 and 0.9.

In further accordance with the invention, an alloy of platinum with two (2) other metals has been found to be particularly useful at resisting dissolution and providing excellent membrane lifetime. Such an alloy has a formula as follows: $Pt_xM_zY_{1-x-z}$, wherein M is selected from the group consisting of Ir, Rh, Co, Ni and combinations thereof, Y is selected from the group consisting of Co, Ni, V, Cu, Fe, Cr, Pd, Ti, W, Al, Ag, Cu and combinations thereof, and x+z is between 0.1 and 0.9.

In accordance with a still further embodiment of the present invention, a suitable alloy can be provided which has a formula as follows: $Pt_xZ_{1-x}$, wherein Z is selected from the group consisting of Ru, Mo and combinations thereof, and x is between 0.1 and 0.9. This alloy is particularly suitable for use in the anode.

The alloy catalyst of the present invention can advantageously either be unsupported or supported on carbon. Such catalyst is advantageously positioned in one or both of the electrodes of the assembly, and is positioned in this manner for functioning as a typical membrane electrode assembly catalyst would function. Thus, the catalyst should be positioned for enhancing the oxygen reduction reaction which normally takes place during fuel cell operation.

During operation of the fuel cell, it has been found that the alloy catalyst resists dissolution as desired.

The alloy catalyst is preferably based upon platinum.

In accordance with the present invention, further steps can be taken to ensure that radicals do not attack the membrane. Such steps include the positioning of an antioxidant, such as RGANOX 1076 produced by Ciba Specialty Chemicals, BLS 1944 or BNX 1010 produced by Mayzo Inc., or other primary antioxidants of the phenolic type, or the like within the membrane. Such antioxidant can scavenge or decompose radical species which reach or are formed in the membrane, and thereby prevent such radical species from attacking membrane material.

The membrane can further be provided with a chelating agent such as IRGANOX MD 1024 produced by Ciba Specialty Chemicals, BNX MD 1097 produced by Mayzo Inc. and the like, which can advantageously scavenge any catalyst metal ion species which do reach the membrane, thereby preventing deposit of such materials in a position where they could otherwise enhance decay of the membrane material.

The end result of the use of the present invention is to provide a hydrocarbon membrane electrode assembly wherein the membrane and other hydrocarbon ionomer material is maintained substantially free of catalyst metal ion species, and of such catalyst metal overall, so as to minimize decay of the hydrocarbon ionomer material.

FIG. 1 shows a schematic representation of a typical membrane electrode assembly 10 including a membrane 12, an anode 14 and a cathode 16. Catalyst is typically positioned within one or both of anode 14 and cathode 16, and the alloy catalyst of the present invention is advantageously positioned in one or both of these locations. FIG. 1 also shows an optional additional layer 18 which is further discussed below.

As set forth above, such use of alloy catalyst advantageously serves to prevent dissolution of metal from the alloy catalyst within electrodes 14, 16, and to thereby prevent such dissolved metals from migrating to the membrane 12, where they can enhance decay of the membrane.

FIGS. 2-5, discussed individually below, demonstrate that the present invention, using alloy catalyst, clearly enhances lifetime of the membrane electrode assembly as desired. The data is presented in terms of per-fluorinated ionomer, but given the discovered greater susceptibility to decomposition of hydrocarbon and/or non-per-fluorinated ionomer, this data remains relevant and indicative.

Figure 2:
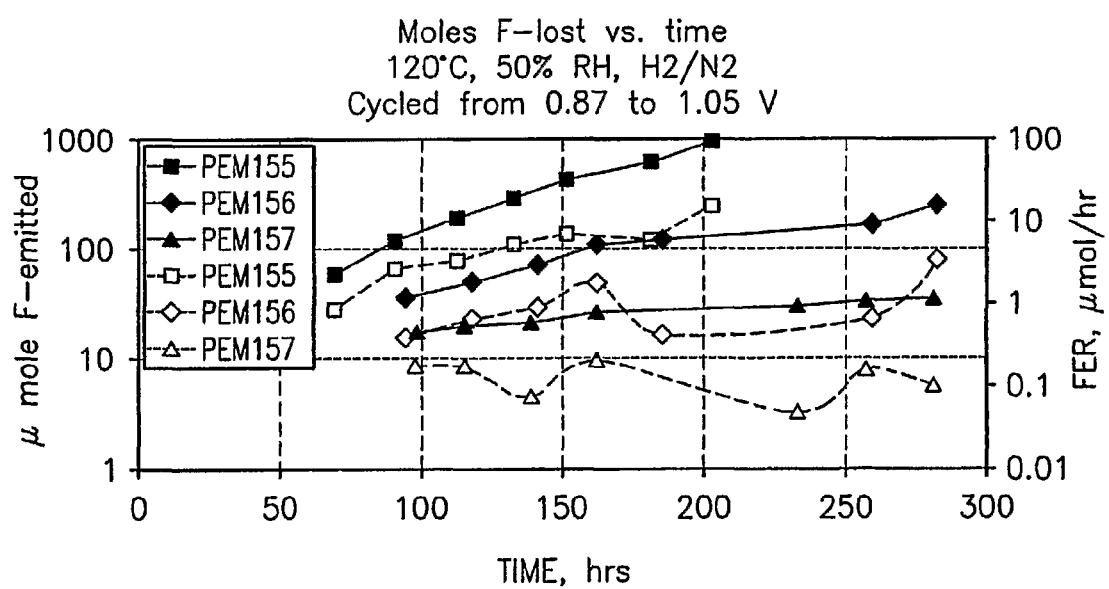
FIG. 2 illustrates fluoride emission results obtained while testing three (3) cells, one of which had platinum catalyst, one of which had a platinum cobalt alloy, and one of which had a platinum iridium cobalt alloy.

FIG. 2 shows results of a comparison of three (3) different fuel cells. One fuel cell included a platinum catalyst (PEM155), one included a platinum cobalt alloy catalyst (PEM156) and one included a platinum iridium cobalt alloy catalyst (PEM157). This testing was conducted at a temperature of 120° C., a 50% RH, under $H_2/N_2$ conditions and with cycling of voltage between 0.87 and 1.05V.

FIG. 2 shows loss of fluoride from each of these cells over time. From this type of ionomer, fluoride exiting the cell is a clear sign of ionomer decomposition. As shown, the fuel cell containing a platinum catalyst had the highest fluoride emissions.

The best (lowest) fluoride emission results were obtained utilizing the platinum iridium cobalt alloy catalyst in accordance with the present invention.

Figure 3:
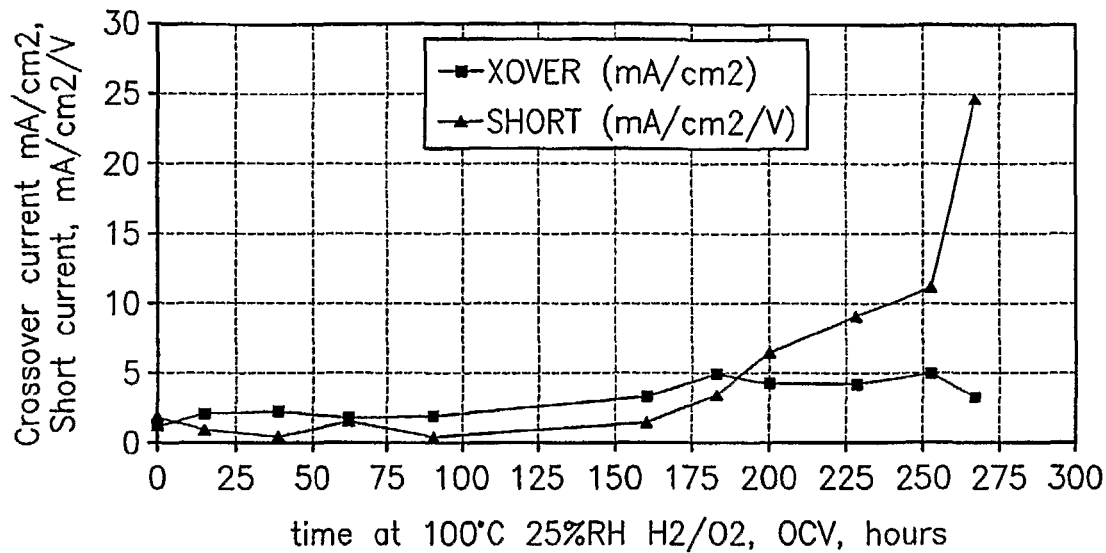
FIG. 3 illustrates hydrogen cross-over results for a platinum iridium cobalt cell.

FIG. 3 shows crossover current and short current over time, for a platinum iridium cobalt alloy catalyst cell in accordance with the present invention. This test was conducted under accelerated conditions, namely, a temperature of 100° C., 25% RH, $H_2/O_2$, and open cell voltage. The membrane used for this test was a Nafion 112 membrane.

FIG. 3 shows that the fuel cell containing a preferred metal alloy catalyst according to the invention operated for in excess of 200 hours under harsh conditions before performance becomes significantly impaired through decomposition.

Figure 4:
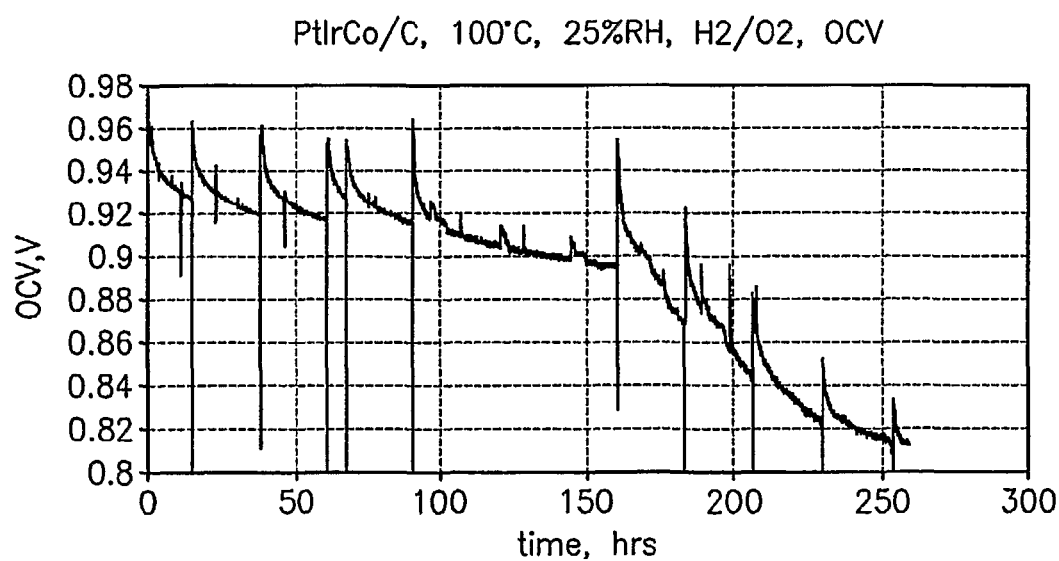
FIG. 4 illustrates open circuit voltage (OCV) over time for a platinum iridium cobalt cell.

FIG. 4 shows open cell voltage over time for a platinum iridium cobalt alloy supported on carbon and using a Nafion 112 membrane. The accelerated conditions for this testing included a temperature of 100° C., 25% RH, $H_2/O_2$ and open cell voltage (OCV).

As shown, open cell voltage measurements were as desired for a substantially extended period of time.

Figure 5:
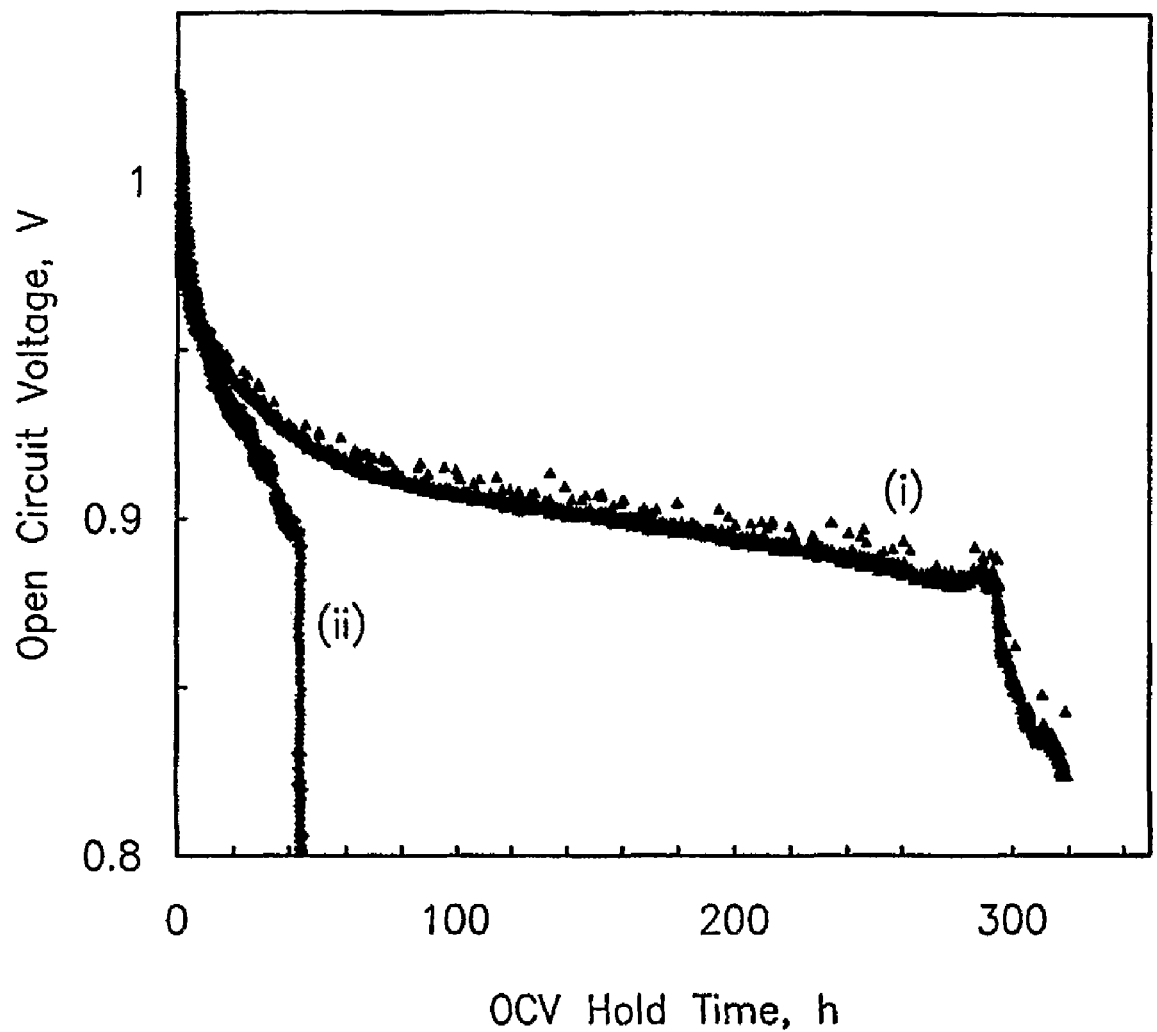
FIG. 5 presents a comparison between a platinum cobalt cell and a platinum cell, both of which are supported on carbon.

FIG. 5 shows a further comparison of open cell voltage over hold time for a platinum cobalt alloy catalyst and a platinum catalyst, both supported on carbon. As shown, the platinum catalyst showed a complete drop of open circuit voltage at a hold time of less than 50 hours, while the platinum cobalt alloy catalyst fuel cell showed stable open circuit voltage up to an OCV hold time of 300 hours.

It is believed that when non-alloyed platinum catalyst is used, operating conditions cause the platinum to migrate to the membrane where the migrated platinum speeds decay of the membrane material.

Based upon the foregoing, it is clear that alloy catalysts in accordance with the present invention serve to advantageously enhance the lifetime of the membrane of a fuel cell containing same.

Referring back to FIG. 1, additional layer 18 was referred to above. This additional layer can be provided as a protective catalyst layer, and can advantageously be positioned between membrane 12 and at least one of anode 14 and cathode 16. FIG. 1 shows layer 18 positioned between membrane 12 and anode 14. It is well within the scope of the present invention to position such a layer also or alternatively between membrane 12 and cathode 16.

Additional layer 18 can be provided to further prevent migration of metal and metal ions as well as precursors to hydrogen peroxide from reaching membrane 12. To this end, layer 18 is advantageously provided with a catalyst which is selected to decompose hydrogen peroxide, and consume hydrogen and/or oxygen, such that these precursors to hydrogen peroxide and subsequent formation of harmful radicals do not reach membrane 12.

Layer 18 advantageously includes a suitable catalyst for guiding the aforesaid reaction, and this catalyst can advantageously be selected from the group consisting of Pt, Pd, Ir, C, Ag, Au, Rh, Ru, Sn, Si, Ti, Zr, Al, Hf, Ta, Nb, Ce and combinations thereof. It is particularly preferred for this additional catalyst to be provided in alloy form, as with the electrode catalyst discussed above. In this way, the additional catalyst can provide its function of consuming peroxide and elements which form peroxide and causing harmless decomposition of these materials, preferably into water, without allowing migration and deposit of metal and metal ions into membrane 12 as discussed above.

Layer 18 is advantageously provided as the additional catalyst positioned within a layer of suitable ionomer material. In this regard, the ionomer material of layer 18 can also be a hydrocarbon ionomer and/or a non-per-fluorinated ionomer, or can be an alternative type of ionomer such as per-fluorinated sulfonic acid ionomer referred to above. Layer 18 advantageously has a porosity which is less than 20%, preferably less than 10%, and this serves to clearly distinguish layer 18 from adjacent electrodes 14, 16 which, among other differences, have a porosity which is greater than layer 18. Layer 18 is also preferably electrically connected with an adjacent electrode 14, 16, which serves to clearly distinguish layer 18 from membrane 12.

Additional details of a suitable layer 18 are disclosed in co-pending and commonly owned PCT Application No. PCT/US2004/043779, filed Dec. 28, 2004, the details of which are incorporated herein by reference in their entirety.

It should be appreciated that the present invention, drawn to reduction of dissolution of catalyst metal and migration of same into the membrane, advantageously accomplishes this purpose. Furthermore, although most useful in connection with the preferred embodiment of hydrocarbon membranes, the method of the present invention for preventing dissolution and migration of catalyst into the membrane could find use with other membranes as well, all within the broad scope of the present invention.

What is claimed is:

1. A membrane electrode assembly, comprising:
   an anode;
   a cathode;
   a membrane disposed between the anode and the cathode, at least one of the anode, cathode and membrane comprising a material selected from the group consisting of hydrocarbon ionomers, ionomers which are not perfluorinated, and ionomers having an inorganic main chain; and
   an electrode catalyst disposed in at least one of the anode and the cathode and comprising a metal alloy catalyst, further comprising a protective catalyst layer positioned between the membrane and at least one electrode of the anode and the cathode and comprising a further alloy catalyst, wherein the protective catalyst layer comprises the further metal alloy catalyst in an ionomer material, wherein the layer has a porosity of less than 20%, and wherein the layer is electrically connected to the at least one of the anode and the cathode.

2. The assembly of claim 1, wherein the material is hydrocarbon ionomer.

3. The assembly of claim 1, wherein the metal alloy is a platinum alloy.

4. The assembly of claim 1, wherein the metal alloy is a binary alloy.

5. The assembly of claim 1, wherein the metal alloy has a formula as follows:

$Pt_xY_{1-x}$, and wherein

Y is selected from the group consisting of Co, Ni, V, Cu, Fe, Cr, Pd, Ti, W, Al, Ag, Cu, Au and combinations thereof, and x is between 0.1 and 0.9.

6. The assembly of claim 1, wherein the alloy comprises an alloy of Pt and two other metals (M and Y) and has a formula as follows:

$Pt_xM_zY_{1-x-z}$, and wherein

M is selected from the group consisting of Ir, Rh, Co, Ni and combinations thereof, Y is selected from the group consisting of Co, Ni, V, Cu, Fe, Cr, Pd, Ti, W, Al, Ag, Cu, Au and combinations thereof, and x+z is between 0.1 and 0.9.

7. The assembly of claim 1, wherein the catalyst is supported on carbon.

8. The assembly of claim 1, wherein the membrane further comprises an antioxidant for decomposing radical species which reach the membrane.

9. The assembly of claim 1, wherein the membrane further comprises a chelating agent for scavenging catalyst metal ion species.

10. The assembly of claim 1, wherein the membrane is substantially free of catalyst metal ion species.

11. The assembly of claim 1, wherein the layer has a lower porosity than the at least one electrode.

12. The assembly of claim 1, wherein the hydrocarbon ionomer is polymeric ionomer wherein less than 99.975% of hydrogen-atoms of covalently bonded hydrogen atom sites are occupied by fluorine atoms.

13. A PEM fuel cell comprising the membrane electrode assembly according to claim 1.

* * * * *